United States Patent [19]

Yergenson

[11] Patent Number: 5,716,744
[45] Date of Patent: Feb. 10, 1998

[54] DUAL BEAM COLOR ELECTROPHOTOGRAPHIC APPARATUS

[75] Inventor: Robin P. Yergenson, Eagle, Id.

[73] Assignee: Hewlett-Packard Company, Palo Alto, Calif.

[21] Appl. No.: 611,356

[22] Filed: Mar. 5, 1996

[51] Int. Cl.⁶ ................................................. G03G 13/01
[52] U.S. Cl. ........................ 430/42; 430/45; 430/54;
399/46; 399/50; 399/51; 399/53; 399/54;
399/151; 399/178; 399/223
[58] Field of Search ............................. 430/42, 45, 54;
399/46, 50, 51, 53, 54, 151, 178, 223

[56] References Cited

U.S. PATENT DOCUMENTS

| 5,314,774 | 5/1994 | Camis | 430/47 |
| 5,534,990 | 7/1996 | Harris | 430/42 |
| 5,552,253 | 9/1996 | Kovacs et al. | 430/57 |

FOREIGN PATENT DOCUMENTS

0599296A1  6/1994  European Pat. Off. ........ G03G 15/01

OTHER PUBLICATIONS

Proceedingss 6Th Annual Laser Printing Conf., Jul., 1995, H. M. Stark, "An Overview Of The Tri-Level Xerographic Process" (pp. 1-15).

Primary Examiner—Mark Chapman

[57] ABSTRACT

An electrophotographic printer produces a multi-color image on a moving photoconductor (OPC) and includes a laser/scanner arrangement for producing first and second beams to expose the OPC at spaced-apart exposure stations. The OPC is charged to a reference state prior to exposure. First and second developer stations are positioned between the first and second beam exposure stations and third and fourth developer stations are positioned after the second beam exposure station in the direction of movement of the OPC. A controller modulates the laser, during each scan, in accordance with subpixel color data from a pair of color planes to achieve a tri-level charge state (including the reference state) on the OPC. The first and second developer stations apply charged toners, selectively, in accord with the tri-level charge state produced by the scan of the first beam. The third and fourth developer stations apply charged toners, selectively, in accord with the tri-level charge state produced by the scan of the second beam. Because certain of the applied toners may deposit over OPC areas previously toned, the color toners are modified to assure faithful color reproduction, even if an overtoning action occurs.

11 Claims, 4 Drawing Sheets

DUAL BEAM COLOR ELECTROPHOTOGRAPHIC APPARATUS

FIELD OF THE INVENTION

This invention relates to color electrophotographic (EP) apparatus and, more particularly, to a dual beam EP apparatus having the ability to produce full-color images.

BACKGROUND OF THE INVENTION

Many color EP printers utilize a four-pass process to produce a full-color image on a photoconductor. In such printers, four developer modules are arranged along a moving photoconductor surface. The developer modules are allocated to the deposition of cyan, yellow, magenta and black toners onto the moving photoconductor. A charging station uniformly charges the photoconductor and an exposure station selectively discharges the photoconductor in accordance with a color plane's image data. The imaged photoconductor then moves past the respective developer modules, with one developer module being moved into juxtaposition with the photoconductor to allow color toning of the discharged areas. The developed photoconductor then experiences a full rotation, is again exposed in accordance with a next color plane's data and is again developed, using a next color developer. The procedure continues until four passes have occurred and full color image is present on the photoconductor. Thereafter, the image is transferred to a media sheet.

Such a system is shown in U.S. Pat. 5,314,774 to Camis, assigned to the same Assignee as this application. The Camis apparatus employs a non-magnetic toner which enables the use of dot-on-dot image development. Because such a printer requires four successive passes to achieve a full color image, the output speed of the printer is limited.

To increase the speed of EP apparatus, the prior art has suggested a single-pass exposure/development procedure. European Patent 0 599 296 to Fukuchi et al. illustrates a single-pass color copier wherein a four plane image memory stores yellow, magenta, cyan and black pixel data. In one embodiment, Fukuchi et al. use a web photoconductor having a plurality of liquid toner developer modules arrayed along one surface. An imaging laser beam is positioned between each developer module and images the photoconductor in accordance with each particular color plane's pixel data. Immediately after each imaging action, development occurs in accordance with the charge states on the photoconductor. The photoconductor is then discharged in accordance with the next color plane's image data and the discharged areas are developed. The procedure continues until all four image planes have been exposed and developed, at which point the image is transferred to a media sheet. As a result of this arrangement, the color print output rate is increased. However, the system requires four separate laser imaging stations and associated optics, thereby substantially increasing the cost of the overall apparatus.

To enable multicolor EP printing without a requirement for multiple laser exposures, certain prior art has employed a trilevel exposure procedure. The Xerox Corporation's 4850 Printer produces dual color printing (e.g., black with one highlight color) via a single pass process. A photoconductor surface is initially charged negatively and a laser exposes the charged photoconductor to three levels as follows: black, unexposed; color, fully exposed; and white, intermediately exposed. Thereafter, a negative color toner is used to develop the fully exposed (discharged) areas and the charged areas are developed using a positive black toner.

(See: Stark, H. M., "An Overview of Tri-Level Xerographic Processes", Proceedings 6th Annual Laser Printing Conf., July, 1995).

A principal object of this invention is to provide an EP print apparatus with an ability to produce full color, high quality media output, while employing a single imaging laser.

It is another object of this invention to provide a full color EP printer with an ability to utilize multi-level charge states on a photoconductor surface to achieve high quality color output.

SUMMARY OF THE INVENTION

An EP printer produces a multi-color image on a moving photoconductor (OPC) and includes a laser/scanner arrangement for producing first and second beams to expose the OPC at spaced-apart exposure stations. The OPC is charged to a reference state prior to exposure. First and second developer stations are positioned between the first and second beam exposure stations and third and fourth developer stations are positioned after the second beam exposure station in the direction of movement of the OPC. A controller modulates the laser, during each scan, in accordance with subpixel color data from a pair of color planes to achieve a tri-level charge state (including the reference state) on the OPC. The first and second developer stations apply charged toners, selectively, in accord with the tri-level charge state produced by the scan of the first beam. The third and fourth developer stations apply charged toners, selectively, in accord with the tri-level charge state produced by the scan of the second beam. Because certain of the applied toners will deposit over OPC areas previously toned, the color toners are modified to assure faithful color reproduction, even though an overtoning action occurs.

BRIEF DESCRIPTION OF THE DRAWINGS

FIG. 2b is a schematic side view of the laser scan optics shown in FIG. 2a.

DETAILED DESCRIPTION OF THE INVENTION

Figure 1:
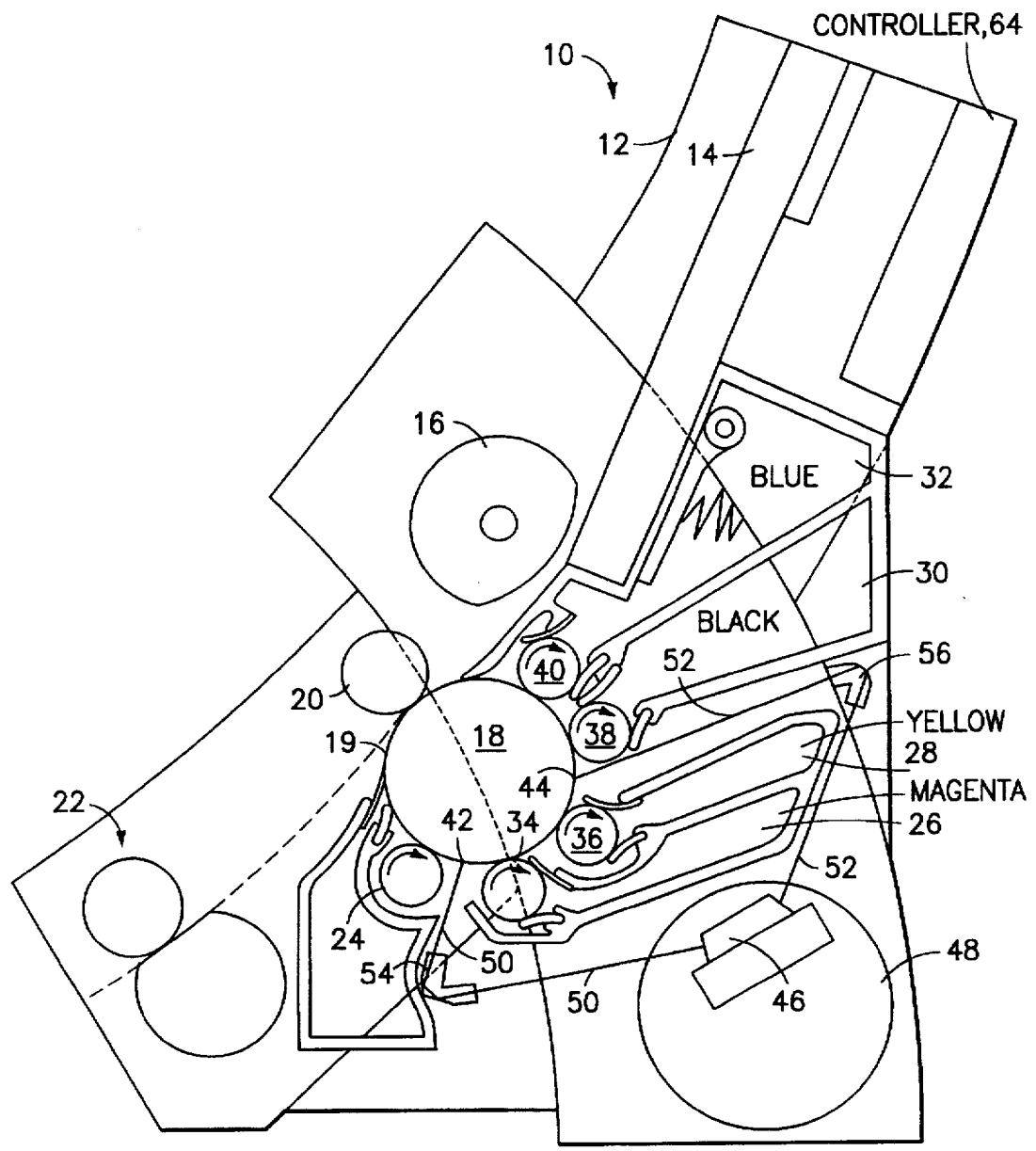
FIG. 1 is schematic side view of an EP printer incorporating the invention.

Referring to FIG. 1, an EP printer 10 is schematically illustrated to show the important features thereof which enable performance of a dual beam scan action to achieve a single pass, full color hard copy output. EP printer 10 includes an outer case 12 which is adapted to receive a media stack 14 in a feed tray. A D-roller 16 feeds a media sheet between a drum 18, that includes an organic photoconductor (OPC) surface 19 and a transfer roller 20. After image transfer form drum 18, the media sheet proceeds through a fusing station 22 and is thereafter ejected.

Drum 18 is positioned so that OPC 19 is in contact or nearly in contact with a charge roller 24 and is juxtaposed to four color toning stations 26, 28, 30 and 32. In the preferred embodiment, toning stations 26 and 28 include magenta and yellow toners, while toning stations 30 and 32 include black and blue toners, respectively. It is preferred that the black toner include a red tint and the blue toner include a cyan inclusion to enable faithful color reproduction, in the event of an overprint. Each of the toners in toning stations 26, 28, 30 and 32 is preferably, but not limited to, a non-magnetic, negatively charged toner.

Each toning station includes a developer roller which assures deposition of its respective toner onto OPC 19 with an appropriate charge state. Thus, developer roller 34, in a preferred example, applies magenta toner to OPC 19 with a –400 volt charge state; developer roller 36 applies yellow toner with a –950 volt charge state; developer roller 38 applies black toner with a –400 volt charge state; and developer roller 40 applies blue toner with a –900 volt charge state. It is to be understood that the aforesaid charge states are actually ranges of charge voltages, centered about the specifically recited values. Each range may vary ±25 volts.

EP printer 10 includes a dual exposure stations 42 and 44 wherein scanned laser beams are incident on OPC 19 and accomplish an image-wise discharge thereof. A rotating, faceted mirror 46 is driven by a motor 48 to develop dual scanned beams 50 and 52 from a single laser source. Scanned beam 50 is reflected by a mirror 54 towards exposure station 42 and scanned beam 52 is reflected by a mirror 56 towards exposure station 44.

Figure 2A:
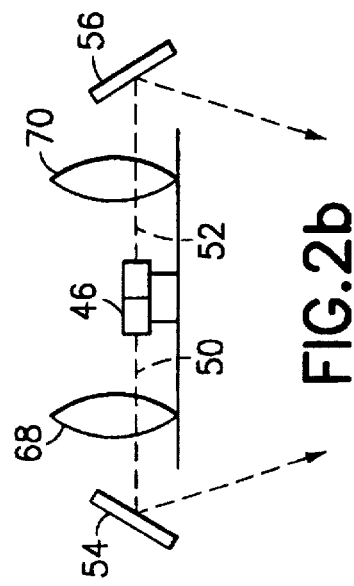
FIG. 2a is a schematic top view of laser scan optics employed in the EP printer of FIG. 1.
Figure 2B:
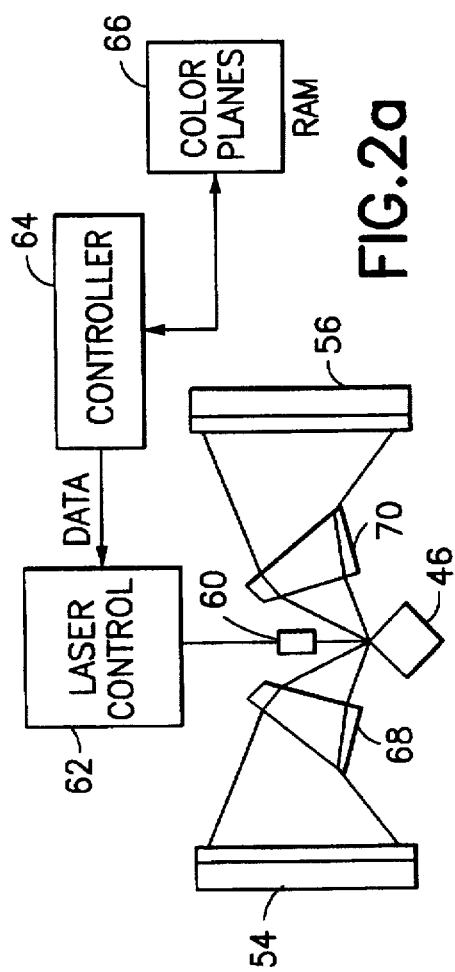
Figure 3:
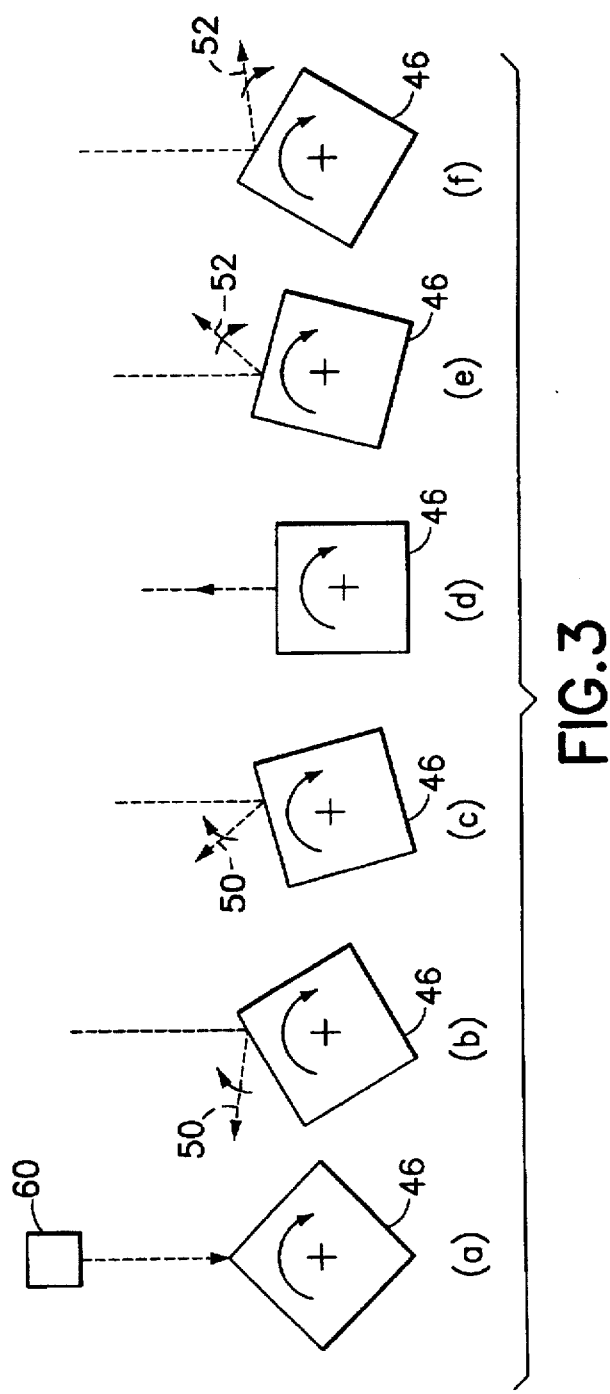
FIG. 3 illustrates how a dual scan beam action is achieved from a single rotating, faceted mirror.

The operation of faceted mirror 46 and the production of scanned beams 50 and 52 will be better understood by referring to FIG. 2a, 2b and 3. A laser diode 60 is controlled, both with respect to emitted power and duration of on/off time, by a laser control module 62 which is, in turn responsive to data input from controller 64. Controller 64, in the known manner, accesses subpixel color plane data form random access memory (RAM) 66 and feeds the subpixel color data to laser control module 62 which, in turn, accordingly modulates laser diode 60. Controller 64 also synchronizes the speed of rotation of faceted mirror 46 and the movement of drum 18.

The beam output from laser 60 is directed to rotating, faceted mirror 46 which causes a scanning of the beam so as to create both rightward directed and leftward directed scan beams. Referring both to FIGS. 2a and 2b, a pair of lenses 68 and 70 (shown schematically) are positioned to either side of rotating faceted mirror 46 and serve to focus scanned beams 50 and 52 onto mirrors 54 and 56, respectively. Beams 50 and 52 are directed by mirrors 54 and 56 towards exposure stations 42 and 44 (see FIG. 1), respectively.

Referring to FIG. 3, as mirror 46 rotates clockwise, i.e., from (a) to (b), beam 50 is reflected to the left and is caused to scan in a clockwise direction as mirror 46 continues its rotation, i.e., from (b) to (c). When faceted mirror has rotated 45°, i.e., at (d) the leftward directed scan is finished and rightward directed scan commences as shown by beam 52 at (e) and (f). In such manner, each 180° of rotation of mirror 46 enables two scans to be accomplished of OPC 19 on drum 18. The first scan is leftward directed via mirror 54 to exposure station 42 and the second scan is rightward directed via mirror 56 to exposure station 44. Accordingly, synchronous exposure actions occur in sequence, but at different locations on OPC 19.

Figure 4:
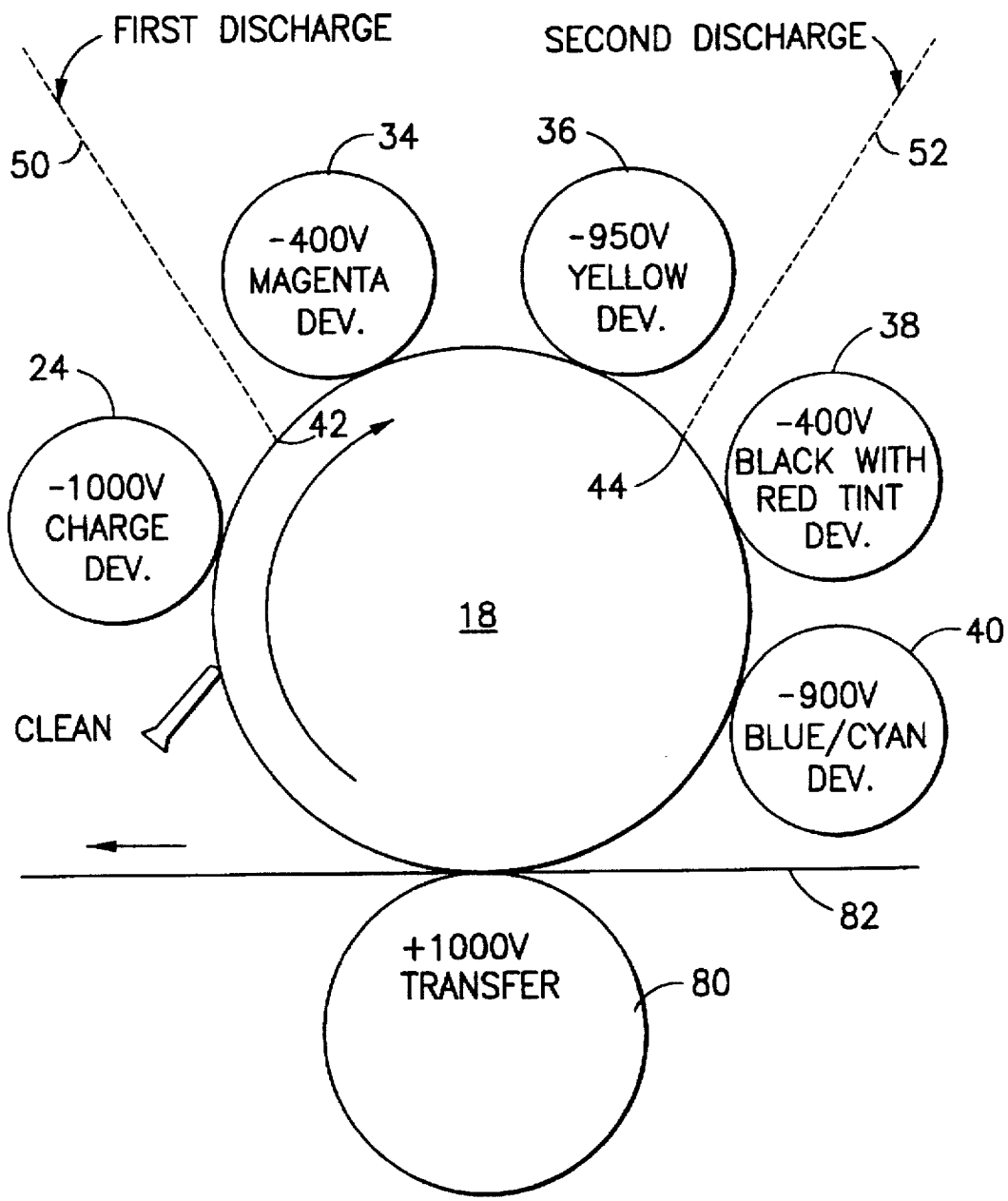
FIG. 4 is a schematic of the OPC drum employed in the EP printer of FIG. 1, showing discharge and development stations and their locations with respect to first and second beam exposure stations.
Figure 5:
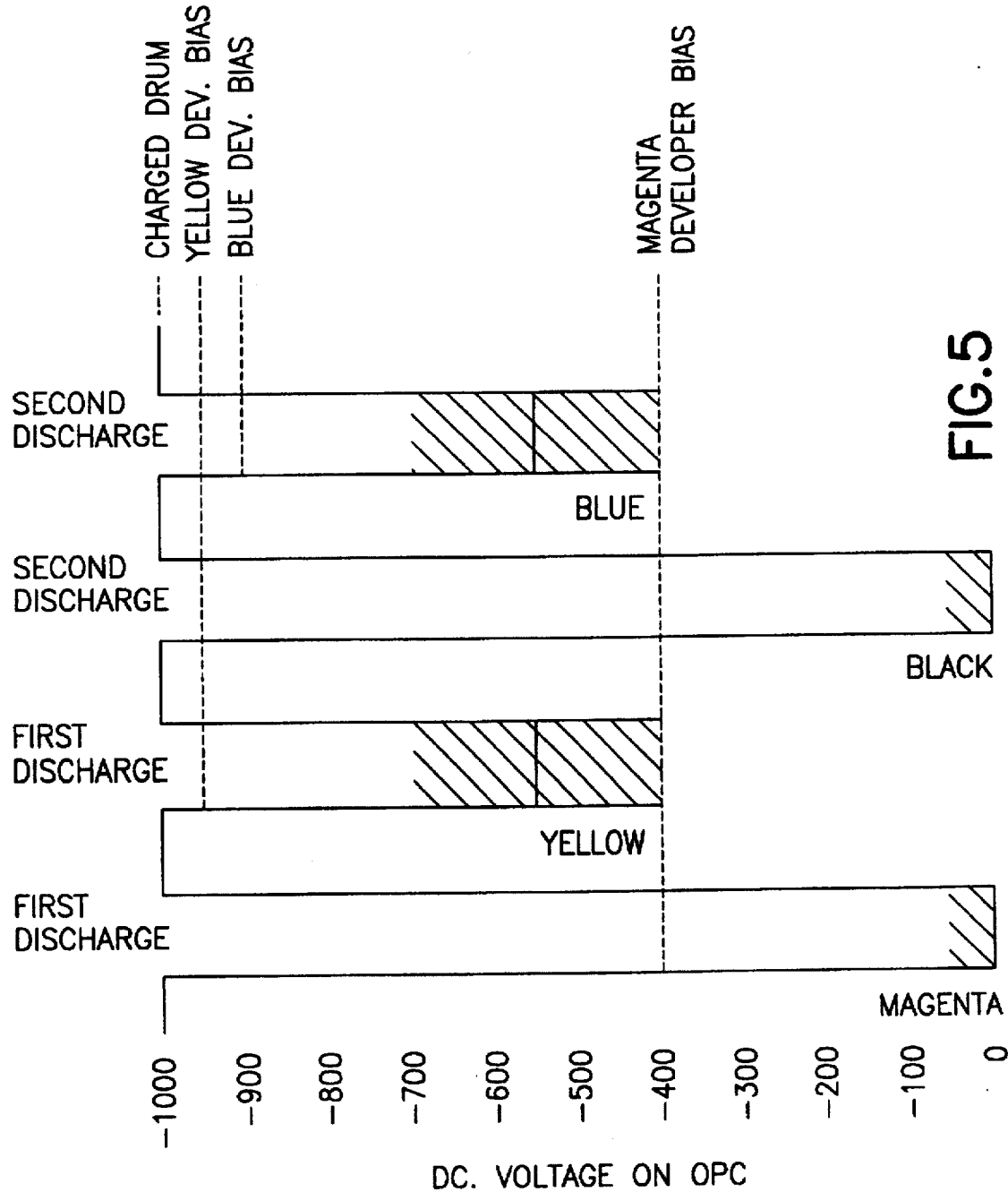
FIG. 5 is a chart illustrating the discharge states achieved as a result of exposure of the OPC by the first and second beams.

Turning now to FIGS. 4 and 5, the operation of the invention will be explained. In FIG. 4, the respective charging and developer drums are shown with their respective applied voltage levels. In addition, a transfer drum 80 is shown which enables transfer of a fully toned image form OPC 19 to a media sheet 82. FIG. 5 illustrates a plot of voltage charge states on OPC 19 versus voltage levels on magenta, yellow, black and blue developer rollers 34, 36, 38 and 40.

The full-color image production process commences, after the surface of the photoconductor has been cleaned, by applying a 1,000 volt charge level to OPC 19 via contact with charge roller 24. Thereafter, first discharge beam 50 is scanned across OPC 19 at exposure station 42. First discharge beam 50 is modulated in accordance with both the yellow and magenta color plane data, using a dot-next-to-dot color half-toning protocol. More specifically, each magenta subpixel is interleaved with adjacent (if any) yellow subpixels so as to enable first discharge beam 50 to discharge OPC 19 during a scan in accordance with data from both magenta and yellow color planes. However, to assure proper, subsequent development actions, each signal representing a magenta subpixel causes laser control module 62 (see FIG. 2a) to control the power output of laser diode 60 in such a manner as to discharge OPC 19 to an approximate zero volt level. Each signal representing a yellow subpixel causes laser control module 62 to control the power output of laser diode 60 in such a manner as to discharge OPC 19 to an approximate level of –550 volts. Thus, at the end of each scan, each magenta subpixel site on OPC 19 evidences an approximate 0 volt state and each yellow subpixel site reflects an approximate –550 volt state.

After the scan/discharge action by first discharge beam 50, the exposed raster scan line on OPC 19 moves past magenta developer roller 34 which is biased to a level of –400 volts. As a result, magenta toner is attracted to the magenta subpixel sites, which evidence a 0 volt charge state, but is repelled from areas evidencing the –1000 volt background charge state and the yellow subpixel sites evidencing a –550 volt charge state.

After magenta development, the exposed scan line moves past yellow developer roller 36 which is biased to a level of –950 volts. In this case, yellow toner is attracted to both the areas of OPC 19 that have been previously toned with a magenta toner (now evidencing a charge state of –400 volts) and to areas evidencing the yellow subpixel charge state of –550 volts. As a result, each magenta subpixel is overlaid with yellow toner, forming red subpixels. The yellow subpixel sites are tones with yellow toner in the known manner.

Thereafter, the partially developed scan line moves to scan station 49 where second discharge beam 52 is modulated and scans OPC 19 in accordance with both black and blue color plane subpixel data. In this case, laser diode 60 is modulated so that each black subpixel site is discharged to approximately a 0 volt level and each blue subpixel site is discharged to approximately a –550 volt level. While it is preferred that the power output of laser diode 60 be altered so as to enable these differential charge states to be accomplished, a similar discharge action can be obtained by modulating laser diode 60 so as to modify its on and off times.

After beam 52 has exposed the raster scan line on OPC 19 in accordance with black and blue subpixel data, the raster scan line moves past black developer roller 38. There, black toner with a charge state of –400 volts is attracted to the black subpixel sites (0 volts) and is repelled by the areas of OPC 19 still at the background charge state (–1000 volts), the red and yellow subpixel sites (about –950 volts), and the blue subpixel sites which are charged to a level of –550 volts. In such manner, each black subpixel is toned with black toner.

The rotation of drum 18 thereafter causes the scan line to move past blue developer roller 40 which is biased to a level of −900 volts. Accordingly, blue toner is attracted to both the blue subpixel sites (at −550 volts), and the black subpixel sites (at approximately −400 volts). Thus, there is some overtoning of blue onto the black subpixel sites, but the inclusion of a cyan component in the blue toner, in combination with a red tinted black, enables a relatively faithful reproduction of black on OPC 19. Thereafter, the fully toned image is transferred to media sheet 82 at transfer roller 80.

Note that the −900 volt developer bias on blue developer roller 40 is approximately 50 volts more positive than the yellow developer roller bias of −950 volts. This prevents the blue toner from depositing on subpixel sites which have previously been developed utilizing the magenta and/or yellow toners at −950 volts.

In the above-described embodiment, the discharge voltage levels created by laser beams 50 and 52 are equal. This need not necessarily be the case, so long as the relative photoconductor charge states are arranged so as to prevent cross-contamination of toners—other than that described above. Further, the given developer roller biases are exemplary and may be altered, so long as the above-described dual scan operation is enabled. Also, while discharge area development using negative charge toner has been described, the invention is equally applicable to charge area development using positive toner charge.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for causing an electrophotographic (EP) apparatus to produce a multicolor image on a moving photoconductor (OPC), through use of first and second optical beams of identical wavelength which expose said OPC at spaced apart locations and first, second, third, and fourth color toners, all exhibiting a like charge relationship with respect to a reference charge, said EP apparatus including means for applying said reference charge to said OPC and plural development stations positioned about said plural optical beams, said method comprising the steps of:

scanning said first optical beam across said OPC to image-wise discharge the OPC to a first charge level at first color subpixel sites and to a second charge level at second color subpixel sites, said second charge level between said first charge state and said reference charge;

applying to said OPC, said first color toner having a first charge state that is between said reference charge and said first charge level, said first color toner being thereby attracted to areas of said OPC evidencing said first charge level;

applying to said OPC said second color toner having a second charge state that is between said reference charge and said second charge level, said second color toner being thereby attracted to areas of said OPC evidencing said second charge level;

scanning said second optical beam across said OPC to image-wise discharge the OPC to said first charge level at third color subpixel sites and to said second charge level at fourth color subpixel sites, said second charge level between said first charge state and said reference charge;

applying to said OPC, said third color toner having a third charge state that is between said reference charge and said first charge level, said third color toner being thereby attracted to areas of said OPC evidencing said first charge level; and applying to said OPC said fourth color toner having a fourth charge state that is between said reference charge and said second charge level, said fourth color toner being thereby attracted to areas of said OPC evidencing said second charge level.

2. The method as recited in claim 1, wherein said second charge state and fourth charge state are such that the fourth color toner is not attracted to OPC areas previously toned with said second color toner.

3. The method as recited in claim 2, wherein said first color toner is magenta, said second color toner is yellow, said third color toner is black and said fourth color toner is blue.

4. The method is recited in claim 3, wherein said third color toner includes a red component.

5. The method as recited in claim 3, wherein said fourth color toner includes a cyan component.

6. An electrophotographic (EP) apparatus for producing a multicolor image on a moving photoconductor (OPC), said EP apparatus comprising:

laser means;

scan means for scanning first and second optical beams of identical wavelength derived from said laser means to expose said OPC at spaced apart locations;

charge means for applying a reference charge to said OPC;

first and second developer stations positioned after said charge means, in a direction of movement of said OPC, and between said first and second optical beams, said first developer station for depositing a first color toner having a first charge state and said second developer station for depositing a second color toner having a second charge state, said first color toner and said second color toner exhibiting an identical charge relationship to said reference charge;

third and fourth developer stations positioned after said second optical beam in said direction of movement of said OPC, said third developer station for depositing a third color toner having a third charge state and said fourth developer station for depositing a fourth color toner having a fourth charge state, said third color toner and said fourth color toner exhibiting an identical charge relationship to said reference charge as said first color toner and second color toner; and control means coupled to at least said laser means and said scan means for scanning said first optical beam across the OPC to image-wise discharge the OPC to (i) a first charge level in accord with first color toner signals and (ii) to a second charge level in accord with second color toner signals, said first charge state of said first color toner being between said reference charge and said first charge level, to enable attraction of said first color toner to areas of said OPC evidencing said first charge level, said second charge state of said second color toner being between said reference charge and said second charge level, to enable attraction of said second color toner to areas of said OPC evidencing said second charge level; and scanning said second optical beam across the OPC to image-wise discharge the OPC to (i) a third charge level in accord with third color toner signals and (ii) to a fourth charge level in accord with fourth color toner signals, said third charge state of said third color toner being between said reference charge and said third charge level, to enable attraction of said third color toner to areas of said OPC evidencing said third charge level, said fourth charge state of said fourth color toner being between said reference charge and said fourth charge level, to enable attraction of said fourth color toner to areas of said OPC evidencing said fourth charge level.

7. The EP apparatus as recited in claim 6, wherein said first charge level and third charge level are the same and said second charge level and fourth charge level are the same.

8. The EP apparatus as recited in claim 7, wherein said second charge state and fourth charge state are such that the fourth color toner is not attracted to OPC areas previously toned with said second color toner.

9. The EP apparatus as recited in claim 8, wherein said first color toner is magenta, said second color toner is yellow, said third color toner is black and said fourth color toner is blue.

10. The EP apparatus as recited in claim 9, wherein said third color toner includes a red component.

11. The EP apparatus as recited in claim 10, wherein said fourth color toner includes a cyan component.

* * * * *